(12) United States Patent
Pires et al.

(10) Patent No.: US 11,962,030 B2
(45) Date of Patent: Apr. 16, 2024

(54) INTEGRATED ENERGY STORAGE SYSTEM (71) Applicant: Tesla, Inc., Austin, TX (US)

(72) Inventors: Andrew Pires, San Francisco, CA (US); Robert David Sumpf, Jr., San Francisco, CA (US); William B. Stockton, San Francisco, CA (US); Cole Spooner, Palo Alto, CA (US); Cole Prodan, Mountain View, CA (US); Jayesh Bharat Gorasia, San Francisco, CA (US); Kenton Harris, Palo Alto, CA (US); Dan Burke, Palo Alto, CA (US); Dafna Gabriela Szafer, Palo Alto, CA (US); Krupal Patel, Palo Alto, CA (US); Benjamin Parker, Palo Alto, CA (US); David Elias Hegeman, San Jose, CA (US)

(73) Assignee: Tesla, Inc., Austin, TX (US)

( * ) Notice: Subject to any disclaimer, the term of this patent is extended or adjusted under 35 U.S.C. 154(b) by 29 days.

(21) Appl. No.: 17/100,700

(22) Filed: Nov. 20, 2020

(65) Prior Publication Data

US 2021/0159567 A1 May 27, 2021

Related U.S. Application Data

(60) Provisional application No. 63/081,253, filed on Sep. 21, 2020, provisional application No. 62/938,646, filed on Nov. 21, 2019.

(51) Int. Cl.
*H01M 50/249* (2021.01)
*B60L 50/64* (2019.01)
(Continued)

(52) U.S. Cl.
CPC .......... *H01M 50/249* (2021.01); *B60L 50/64* (2019.02); *H01M 10/613* (2015.04);
(Continued)

(58) Field of Classification Search
None
See application file for complete search history.

(56) References Cited

U.S. PATENT DOCUMENTS

| 2008/0311468 | A1 | 12/2008 | Hermann et al. | |
| 2010/0136396 | A1 | 6/2010 | Hermann et al. | |
| 2010/0151308 | A1 | 6/2010 | Hermann et al. | |
| 2012/0160583 | A1* | 6/2012 | Rawlinson | H01M 50/242 903/952 |

(Continued)

FOREIGN PATENT DOCUMENTS

EP 3188279 7/2017

OTHER PUBLICATIONS

International Search and Written Opinion for International Application No. PCT/US2020/061626, Notification dated Apr. 14, 2021.

*Primary Examiner* — Lisa S Park
(74) *Attorney, Agent, or Firm* — Knobbe, Martens, Olson & Bear, LLP (57) ABSTRACT

An integrated, unitary battery pack may be formed and used as part of the structural support for a vehicle frame. The unitary battery pack includes arrays cells having all positive and negative electrical terminals aligned in-plane on a common face of the product assembly. The unitary battery pack includes cooling components for passively or actively cooling the cell arrays. The unitary battery pack is encased in a potting material that allows that forms part of the structure support for the unitary battery pack. The unitary batter pack may be integrated into the vehicle with or without additional support structures.

31 Claims, 10 Drawing Sheets

(51) Int. Cl.
*H01M 10/613* (2014.01)
*H01M 10/625* (2014.01)
*H01M 10/643* (2014.01)
*H01M 10/6556* (2014.01)
*H01M 10/658* (2014.01)
*H01M 50/213* (2021.01)
*H01M 50/271* (2021.01)

(52) U.S. Cl.
CPC ....... *H01M 10/625* (2015.04); *H01M 10/643* (2015.04); *H01M 10/6556* (2015.04); *H01M 10/658* (2015.04); *H01M 50/213* (2021.01); *H01M 50/271* (2021.01); *H01M 2220/20* (2013.01)

(56) References Cited

U.S. PATENT DOCUMENTS

| | | | |
|---|---|---|---|
| 2013/0017422 A1* | 1/2013 | Bae | H01M 50/20 429/82 |
| 2013/0199864 A1* | 8/2013 | Enning | B62D 21/152 180/271 |
| 2014/0178742 A1* | 6/2014 | Krahn | H01M 50/116 429/151 |
| 2014/0284125 A1* | 9/2014 | Katayama | B60L 58/21 180/68.5 |
| 2015/0280183 A1* | 10/2015 | Utley | H01M 50/291 429/99 |
| 2017/0162922 A1 | 6/2017 | Sumpf, Jr. et al. | |
| 2018/0190960 A1* | 7/2018 | Harris | H01M 50/502 |
| 2018/0301771 A1* | 10/2018 | Jennrich | H01M 10/653 |
| 2019/0372169 A1* | 12/2019 | Myers | H01M 10/654 |
| 2020/0335740 A1* | 10/2020 | Stanger | H01M 50/213 |
| 2021/0320343 A1* | 10/2021 | Flannery | H01M 10/6557 |

\* cited by examiner

INTEGRATED ENERGY STORAGE SYSTEM

CROSS-REFERENCE TO PRIOR APPLICATIONS

This application claims priority to U.S. Prov. App. No. 62/938,646 titled "INTEGRATED ENERGY STORAGE SYSTEM" and filed on Nov. 21, 2019, and U.S. Prov. App. No. 63/081,253 titled "INTEGRATED ENERGY STORAGE SYSTEM" and filed on Sep. 21, 2020, the disclosures of which are hereby incorporated herein by reference in their entirety.

BACKGROUND

Generally described, a number of devices or components may be powered, at least in part, by an electric power source. In the context of vehicles, electric vehicles may be powered, in whole or in part, by a power source. The power source for an electric vehicle may be generally referred to as a "battery," which can represent individuals battery cells or cells, modules and packs. In some approaches, a cluster of cells be considered as individual modules and a cluster of modules can be considered a pack. The power sources for electric vehicles can be installed and maintained in a pack configuration. Similar approaches/terminology can apply to grid storage application for collecting, storing, and distributing energy.

Electric vehicles typically require a large multiple of power, sometimes as much as a thousand times stronger than that of a typical consumer device, such as a mobile device. To achieve these power requirements, the battery pack of electric vehicles typically include a large, dense arrangement of individual cells, individually placed or configured into a plurality of modules. The composition and performance of the battery pack will depend on the characteristics of the individual battery cells, the total number of individual cells that are incorporated into the battery pack, and configurations/orientations of the cells and ancillary components into modules or the battery pack. The battery pack may represent one of the most expensive and massive assemblies in the context of most electric vehicle transportation and grid storage applications.

DETAILED DESCRIPTION

Generally described, one or more aspects of the present disclosure relate to energy storage systems including a unitary battery pack or module that need only be supported along an outer perimeter. Illustratively, an integrated, unitary battery pack may be formed and used as part of the structural support for a vehicle frame. For example, the battery pack may include a bottom layer that is formed from a honeycomb or ridged surface which is mechanically linked to cells within the battery pack. The bottom layer is designed so that it can absorb and distribute impact energy from below, mitigating potential damage sensitive battery materials or breach of the sealed battery pack enclosure. In one embodiment, the bottom layer is made from a material that has sufficient stiffness and strength to support the battery cells and react mechanical loads from normal vehicle operation, but also can deform in response to a road strike from below that would otherwise cause failure in the battery pack system. In addition to creating a flexible or crushable structure, the series of ridges can allow gasses to escape from the battery pack should damage occur to a particular cell, or in the event of a thermal runaway occurring within one or more cells of the battery pack.

The illustrative integrated, unitary battery pack can further include one or more characteristics or features that can be combined within the structural frame holding battery pack modules or array of battery cells. Aspects of the various features will be described below. In one aspect, such features can include the structural frame of the battery pack corresponding to a sealed container which contain energy storage cell units/arrays and include a resin. The resin can be selected and implemented according to thermal and structural performance or thresholds. In another aspect, such features can include arrays of small or large format cells having all positive and negative electrical terminals aligned in-plane on a common face of the product assembly. In still another aspect, such features can include components for thermal management of the cell arrays include various cooling components for passively or actively cooling the cell arrays. In yet another aspect, such features can include materials to electrically insulate cells from neighboring components. In a further aspect, such features include one or more conductive foil sheets for electrical interconnection of cell and battery terminals, and voltage sensing channels. In yet a further aspect, such features can include one or more electrical fusing elements. In yet another aspect, such features can include electronics for measurement & control of product voltage/temperature.

Although the various aspects will be described in accordance with illustrative embodiments and combination of features, one skilled in the relevant art will appreciate that the examples and combination of features are illustrative in nature and should not be construed as limiting.

As incorporating into various embodiments, such as electric vehicles or grid storage networks, implementers or manufacturers of energy storage systems will look reduce the cell and non-cell overhead costs of the energy storage system, such as material costs, capital expenses, operating expenses, and limited manufacturing scrap. Additionally, implementers or manufacturers may also look to reducing the overhead volume and mass of the energy storage system, which may further limit maximum volumetric or gravimetric packing density of the energy cells incorporated in the energy storage system. In certain applications, energy storage systems may also be configured or manufactured to provide additional non-cell performance functionalities by engaging the inherent materials & geometry of the array of energy cells (cell array) and supporting components, such as the pack enclosure. By implementing such configurations, implementers or manufacturers can reduce or mitigate additional costs, mass, volume, and complexity of structure previously provided by other structures or components within the battery, or elsewhere on the electric vehicle (or other device) frame. Dramatically simplified manufacturing assembly accelerates design, launch, and scaling of high-volume automated manufacturing facilities, while for a given production capacity, reducing equipment footprint.

One or more aspects of the present application may address such implementation challenges and inefficiencies, individually or in combination. For example, as discussed herein laser-welded interconnects along a common plane of the cell arrays create electrically-conductive connections which are used to supply voltage & current with low heat losses, connect voltage-sensing & controlling electronics, all with low manufacturing footprint/operation expenditure compared to previous methods. In another example, structural resin in the battery pack frame can be used to position & constrain cells in the final product, react inertial loads from shock and vibration, effectively manage provoked & unprovoked thermal runaway, and provide additional passive heat-sinking capacity and parallel thermal pathway to an active cooling system. In a further example, incorporation of dielectric cell sleeves on individual cells in the battery array creates an electrical barrier that electrically isolates the energy storage units from the product frame, other cells, and the active cooling system (if equipped and of electrically conductive construction). Applying the electrical insulation at the cell level enables the construction of a series voltage string with maximum volumetric packing density of battery cells, as the need for physical spacing the electrically conductive cell containers is eliminated. One skilled in the relevant art will appreciate additional advantages or technical efficiencies may be associated with one or more aspects of the present application or combinations of aspects without limitation.

Illustrative Battery Pack Frame Structure

In one embodiment, the battery pack may be provided in a frame structure that form a sealed container either upon manufacturing assembly completion, or as part of the battery pack marriage with rest-of-product, such as in an electric vehicle. The frame structure may consist of single or multiple materials & components, either pre-assembled or formed by series component addition. Seals may be designed such that they are energized/activated by the inherent mass or loads applied to components during manufacturing assembly. The frame structure may include various mechanical or electrical interfaces for constraining or interconnecting other functional components. For example, the frame structure can include interface for functional electronics or high-gauge terminals (bus bar) suitable for carrying highly concentrated electrical current into a battery interface point. The frame structure can also include additional components or features for facilitating single-cell, multi-cell, and array-level performance in thermal runaway events.

Illustratively, the frame structure is configured or constructed with one or more cavities or defined areas for receiving a set of cell arrays or modules including cell arrays. The frame structure can be constructed with structural properties adequate for suspending the mass of the cell arrays or cell modules within the defined area. Additionally, the frame structure can further be constructed to tolerate or manage abuse loads or impacts from above or below the frame structure to protect the functional integrity of the battery pack as a whole or the cell arrays or modules.

When incorporated in an electric vehicle, portions of the frame structure may be constructed from or coated with electrically insulating materials to isolate, in a volumetrically-dense manner, the electrical conduction chain from proximal product chassis components.

Additionally, as will be explained in greater detail below, portions of the frame structure may serve as a mold negative for a resin, such that geometries beneficial to the product are achieved as part of the resin fill process.

Figure 1A:
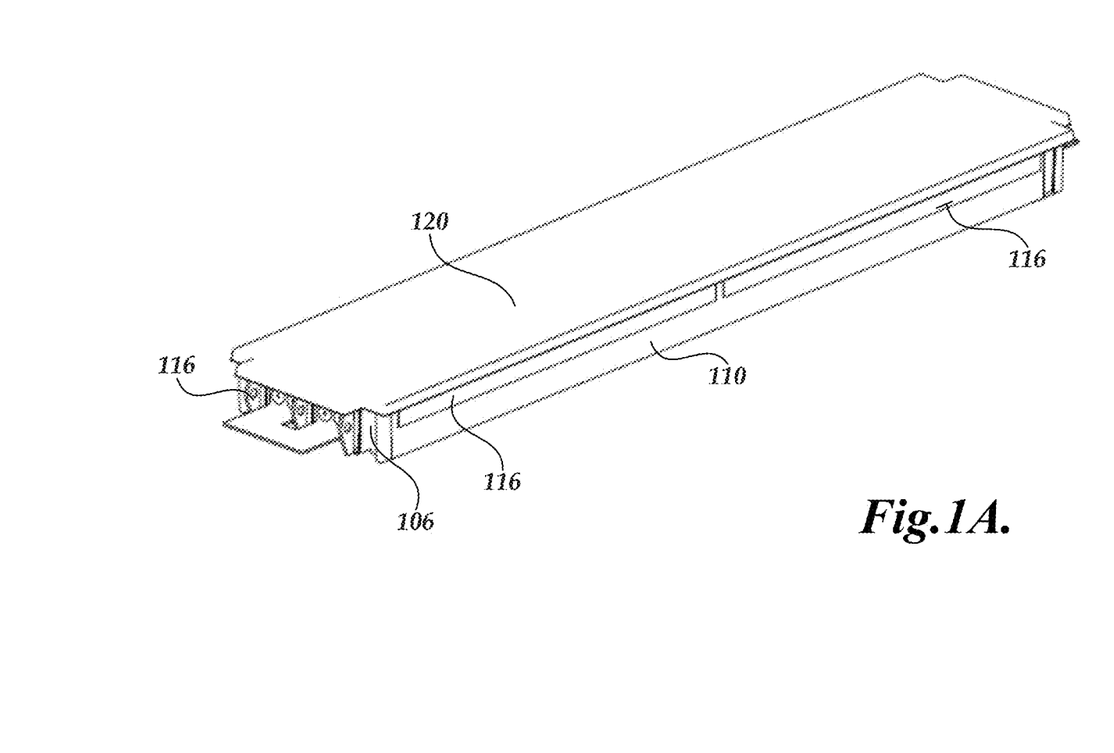
FIG. 1A is a block diagram depicting illustrative components of a unitary battery pack in accordance with illustrative embodiments.
Figure 1B:
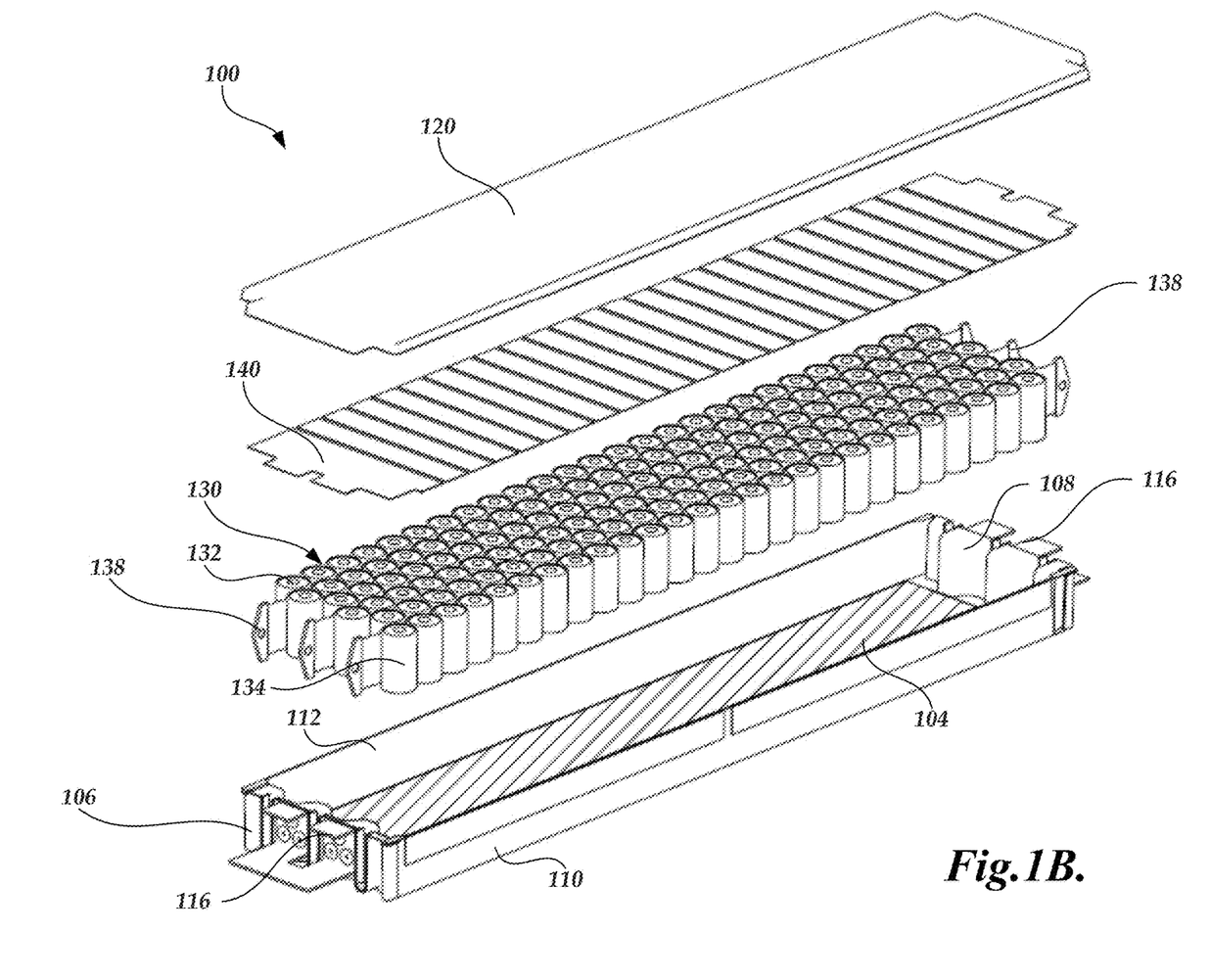
FIG. 1B is a block diagram depicting illustrative components of a unitary battery pack in accordance with illustrative embodiments

With reference to FIG. 1A, an illustrative energy storage system 100 corresponding to a cell array module is illustrated. The energy storage system 100 illustrates a sealed container including various components and features described herein. With reference to FIG. 1B, an explode view of the energy storage system 100 of FIG. 1a is illustrated. With reference to FIG. 1B, the energy storage system 100 includes a frame structure 102, 120. Illustratively, the frame structure 102, 120 corresponds to six individual sides that will result in the sealed container of FIG. 1A. The structures illustrated in FIG. 1A correspond to a three-dimensional structure for purposes of illustration. One skilled in the relevant art will appreciate that the dimensions of the energy storage system can vary based on the number of cells 132 will be utilized and the geometric shape of the cells. Additionally, the energy storage system can further correspond to custom shapes and configurations that may be configured to be integrated with a vehicle and may be uniquely configured.

In one embodiment, the frame structure 102 includes a bottom surface 104 that is illustratively a mineral sheet. The bottom surface may be selected or constructed to be relatively thin and mechanically brittle for low-backpressure rupture of the bottom surface in the event of a battery cell thermal runaway. The bottom surface may be mechanically stable against high-velocity gas erosion and be constructed of materials that exhibit high melting temperature and high thermal resistance to protect the cell array from harmful convective heat transfer. An inner portion of the bottom surface will illustratively be relatively plane or flat for adhesively-retained cell array alignment and also exhibit low deformation under load so as to effectively react downhold forces required to press out foil-to-terminal gaps during electrical interconnect manufacturing. In some embodiments, the bottom surface may be formed or corrugated to provide continuous mounting to a vehicle or other structure.

The bottom surface may also provide support or energy absorption for a battery base plate for reduced physical intrusion or distributed cell strain, and a reduction to the combined mass of the battery system components. In some embodiments, the ridged bottom surface tray may be replaced by 'negative geometry' which closes off cell venting volume from potting resin ingress, thereby enabling a direct resin mechanical bond to the battery floor. In still further embodiments, the ridged bottom surface may be replaced entirely by a honeycomb sandwich panel.

The portion of the frame structure 102 can further include one or more molded end caps or side surfaces 106, 108 that correspond to the sides frame structure where hydraulic interfaces are located. The side surfaces 106, 108 can be constructed/configured for low cost & geometrically tolerant sealing around thermal and mounting interfaces. The side surfaces 106, 108 may include features for ultrasonically or heat-staked electrical terminal bus bar retention. In some embodiments, one side surface, such as side surface 106 may include components or interfaces corresponding to positive terminal connectors for the energy storage system 100 while the other side surface 108 may include components or interfaces corresponding to the negative terminal connectors for the energy storage system. In another embodiment, the side surface can be employed to position and constrain functional electronics.

Figure 4:
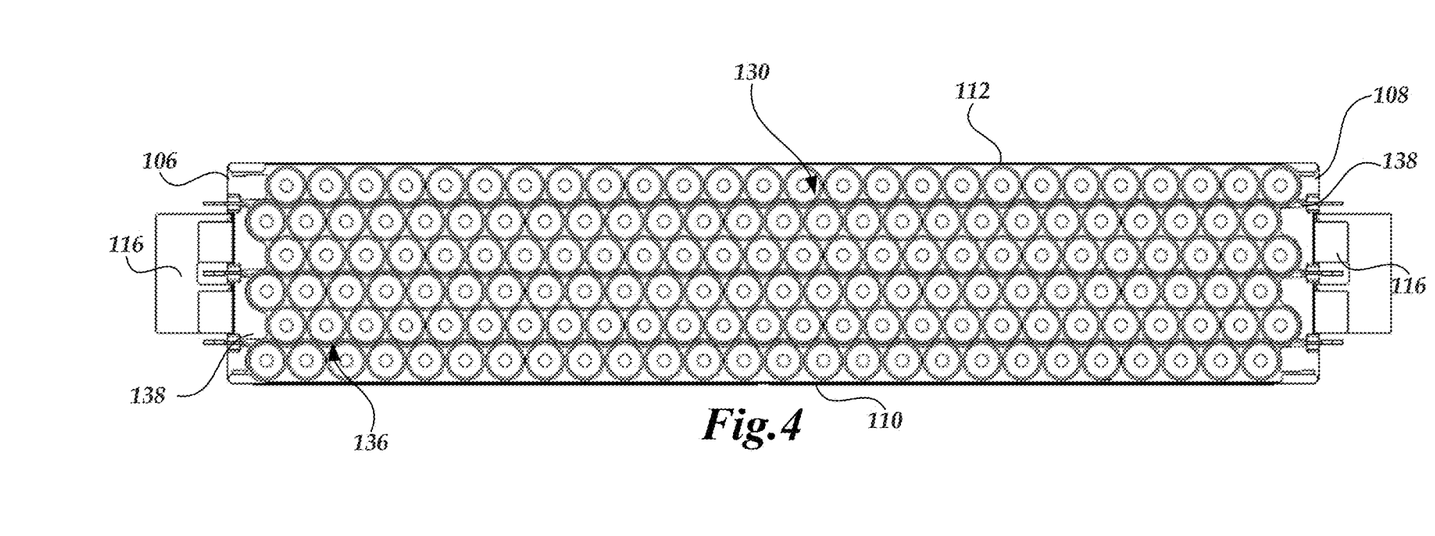
FIG. 4 is a block diagram depicting illustrative components of a unitary battery pack in accordance with illustrative embodiments.

The frame structure 102 can further include one or more surfaces 110, 112 that correspond to the remaining vertically oriented faces of the frame structure. The side surfaces 110, 112 can corresponding to molded engineering-grade filled or unfilled plastic mounts with waffle pattern for engaging adhesive resin in shear as well as peel loading. The side surfaces 110, 112 can further include features for ultrasonically or heat-staked electronics/PCBA and access ports for integrated thermal instrumentation. The side surfaces 110, 112 can further include for positioning the cell array relative to the frame structure 102. Additionally, in some embodiments in which the cell array positive and negative terminals correspond to the same plane, interfaces for electrically connecting to the cell arrays and sensing electronics are at a level where the plane intersects the side surfaces 110, 112. One or more electrical interconnects 116 are illustrated as being mounted on side surfaces 106 and 110 for purposes of illustration. In one embodiment, the interconnects 116 are mounted on the side surface such it can make electrical connectivity with individual cells 132 that form a substantially horizontal plane based on alignment of top surfaces. This is also illustrated in FIG. 4.

In some embodiments, the frame structure can be associated with a lid 120 that can be integrated with the frame structure 102 or a separate component mounted on the frame structure. The lid 120 can corresponding to a thermoplastic, mineral, or electrically insulated metallic sheet. The lid can include with soft foam perimeter seal to seal-in resin, as well as molded or formed perimeter walls to aid alignment of the seal during assembly. In some embodiments, the lid can serve as dielectric insulation barrier between cells/electronics and battery enclosure. The lid 120 can also provide can interface for suction lifting. The lid 120 illustratively captures a set thickness of upper surface of the resin material (e.g., the potting material), and may be configured or constructed of materials that provide a thermal barrier during thermal runaway. The lid 120 may be die cut or formed then die cut. In some embodiments, the lid 120 may be replaced by grid or waffle pattern to provide electrical isolation by distance while allowing direct bond to battery cover without introducing rigid material stack for topside abuse. Still further, in other embodiment, the lid 120 may be removed altogether, and replaced with an application of a dielectric coating or lining to the top cover of the battery enclosure, which enables a direct resin bond of the at-potential cell array lying beneath.

In additional embodiments, the unitary battery pack may be encased in additional framing structures such that the unitary battery pack is not necessarily integrated directly into the vehicle structure while providing support for the vehicle. In this regard, a plurality of individual battery packs may be provided in a vehicle. The vehicle can further include additional struts or support structures in addition to the battery pack for additional support. For example, the vehicle portion can include struts crossing the width of a set of unitary battery packs or in parallel to a set of unitary battery packs. The additional struts or support structures may be configured to provide additional support for additional components associated with the vehicle, such a set of front or rear seat. in another example, support struts may be incorporated into one or more sides of the vehicle or adjacent to a set of unitary battery packs to react or absorb compressive, tensile, torsional, shear, or bending stresses imposed by other components, passengers, or loads from the vehicle. The geometric shape of the additional struts and the set of unitary battery packs may be selected to present relatively flat lower surfaces of the vehicle for placement of additional components. Depending on the implementation of the unitary battery packs and the potential potting materials utilized in the cell arrays, as discussed below, such struts or other support structures may not be necessary and can be considered optional or removed altogether.

Illustrative Cell Arrays

Figure 2A:
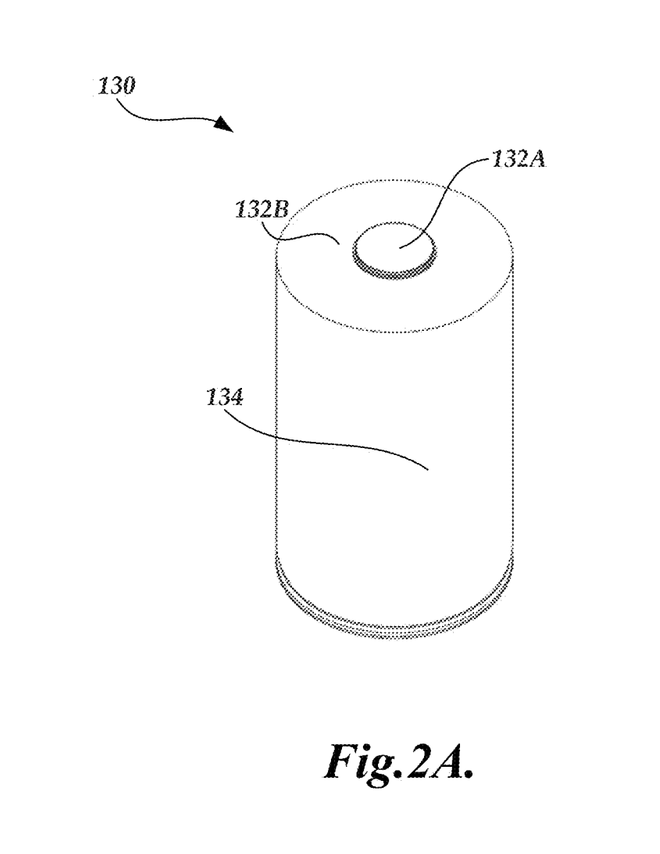
FIG. 2A is a block diagram depicting illustrative components of a cylindrical-shape cell for utilization in an array of cylindrical-shaped storage arrays in accordance with aspects of the present application.
Figure 2B:
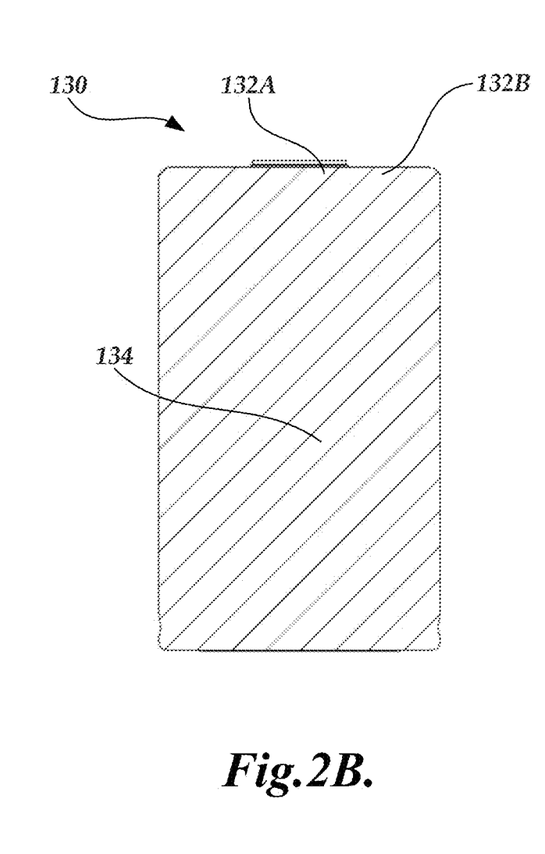
FIG. 2B is a block diagram depicting illustrative components of a cylindrical-shape cell for utilization in an array of cylindrical-shaped storage arrays in accordance with aspects of the present application.

With continued reference to FIG. 1B, the energy storage system can further include a cell array 130. The cell array 130 can include a plurality of individual cells in which the individual cells may be of small or large form-factor, rectangular or cylindrical in shape. One skilled in the art will appreciate that additional or alternative shapes of the cells beyond cylindrical-shaped and rectangular-shaped cells may also be utilized. Additionally, it may be possible incorporate cell arrays of different shaped cells in some alternative embodiments. FIGS. 2A and 2B illustrate two viewpoints for the individual cells 132 for utilization in a cell array, such as cell array 130. Returning to FIG. 1B, the groupings of cells 132 may be arranged as modules or arrays that are lined up in common orientation. In other embodiments, series groupings of cells may be arranged as modules in alternating or staggered orientation.

In one embodiment, all positive and negative cell terminals for individual cells are aligned in a common planar direction relative to the array of cells. For example, as illustrated in FIGS. 2A and 2B, each individual cell may include a positive terminal 132A and negative terminal 132B on the top surface of the cell such that both terminal surfaces are on a substantially similar horizontal plane. Such common planar direction, or substantially planar direction facilitates primary and secondary electrical interconnects along a common plane required for power delivery, series voltage sensing, and inclusion of electrical terminal interfaces for the cell array. Additionally, electric connectors or interfaces may be incorporated into the walls of the frame structure 102.

In one embodiment, there is a dielectric sleeving preapplied to the outer surface of individual cells 134 (FIGS. 2A and 2B), such as a dielectric sleeve that substantially encompasses the cylindrical side surface of each cell 134. The cells may be intentionally spaced apart or kept in direct contact (maximum packing density). Use of a dielectric cell sleeve on the side surfaces 134 may function to improve volumetric energy density, reduce internal void volume (which reduces cost, and consequently mass, for structurally filled module configurations), which in turn may promote balanced diffusion of thermal energy from provoked or unprovoked thermal runaway, thereby reducing likelihood of propagation to module or pack-level safety event. The dielectric cell sleeving also allows neighboring components to be made of electrically or thermally conductive materials for application-specific performance.

The cell array 130 may be passively or actively cooled on one or more faces via liquid and/or gas. In one embodiment, the cells are cooled on the curved side interface utilizing a thermal component 138 that is placed in spacing 136 (FIG. 4) provided between individual cell arrays. In this aspect, the arrangement of the cell arrays are configured to form the spacing that provides for contact of the thermal components 138 with side surfaces of the individual cells 132. Cooling the curved side interface allows for pressure venting and electrical terminal cell functions to exist on opposite/independent flat faces of individual cells 132, maximize cell container height which can be packaged in vehicle product (active material cost overhead benefit), and locates the thermal interface outside of a series load and heat leak path for the energy storage system 100. The resulting cooling channels created by the thermal management components 138 created to package the side-cooling architecture also provide pathways for cross-flow of structural resin during the manufacturing fill process. The thermal management components 138 may be pre-assembled as either part of the sealed resin container, or directly to sections of the cell array in advance of introduction to the container. In one embodiment, the shape of the thermal management components 138 is selected to precisely locate the cell within the product, with an adhesive introduced to freeze this favorable position while simultaneously improving thermal conductivity overall magnitude & variation levels between cell active materials and the thermal management system.

Illustratively, the thermal management component 138 can correspond to a cooling tube or plate material may be metallic or plastic. The thermal management component 138 form may be U-shaped or V-shaped to trade lowest thermal resistance against highest-precision cell location. The tube extrusion of the thermal management component 138 may be crushed to achieve pressure drop and thermal resistance improvements for identical cell grid geometric overhead, in addition to improving cell position precision in the presence of part quality defects. Still further, the resulting cooling channel manifolding may be mirrored to cancel out effects of flow imbalance from stemming from mismatched length of parallel channels In one embodiment there exists within each cooling channel there is a separated "supply" and "return" section, also known as "U-FLOW", which can be used to collapse thermally-induced intra-parallel brick voltage gradients that negatively impact performance via current balance and supercharge temperature limits. The "U-FLOW" arrangement may also be used to reduce cell array overhead packaging volume by consolidating/more efficiently nesting bulky components/interfaces along a single side of the cell array. Another benefit of consolidating the hydraulic interfaces to a common face of the cell array is a reduction of sealing interfaces to be included on the resin container (potential leak points) which may also consequentially ease the packaging of nearby measurement & sensing electronics components.

Figure 3:
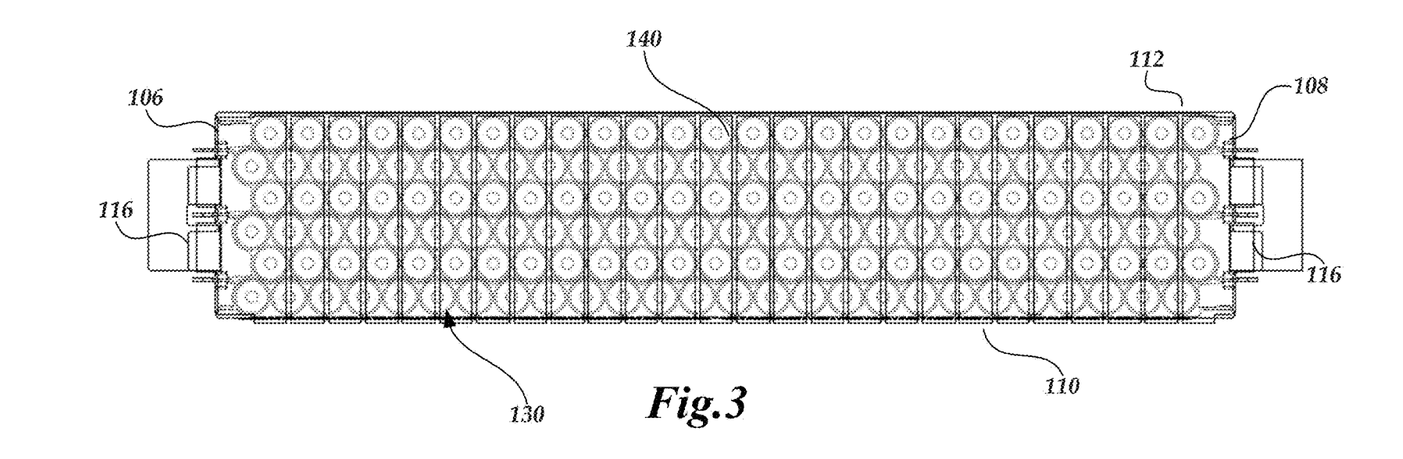
FIG. 3 is a block diagram depicting illustrative components of a unitary battery pack in accordance with illustrative embodiments.

In an embodiment with alternating orientation cells, the ends of the cooling channels 138 may be used as an interface for mounting electrically-isolated conductors which bridge upwards the lower-side voltage brick foil sheets 140 for interconnect to sensing & measurement electronics, also illustrated in FIG. 3. The conductive foil sheet (or sheets) 140 may be of a single, or various gauges to interconnect energy storage units in series & parallel and satisfy resistive heating, current balance, and mass/cost/manufacturing methods demanded by the application. The primary conductive foil sheet 140 may be broken down or organized into N+1 discrete sections, where N is the series cell count of the energy storage array. Each section joins the negative terminals of one parallel cell section to the positive terminal of the following parallel cell section. The discrete sections may be added individually, or as part of a laminated pre-assembly. The direction of series voltage build may be parallel or perpendicular to the direction of cooling fluid flow, or some combination of the two). When multiple conductive foil sheets 140 are implemented (in alternating cell orientation architectures, for example), the foil sheets may be installed on two or more faces of the cell array assembly. The foil sheets 140 may be installed on the face of the cell array assembly as described herein.

In one embodiment, the pre-assembly may begin as a single foil sheet of conductive material and be separated in-process to create the N+1 discrete sections. The discrete plates which form the primary conductive foil sheet may be directly connect to voltage-sensing electronics via extensions or integrated traces. A second layer of conductive foil sheeting may instead be added to accomplish this function. Thereafter, the primary conductive foil sheet is laser-welded to create an electrical connection with the cell, sensing electronics, and positive/negative array terminals. Illustratively, the foil design may include multiple parallel tabs per terminal to reduce resistive losses or serve as dedicated manufacturing rework locations. Additionally, the foil tabs may be oversized to account for down-holding fixtures and test probes for electrical interconnect quality verification.

The foil or tab profile may be varied locally to mitigate current imbalances stemming from product geometry and cell array layout. The primary conductive foil sheet may elegantly incorporate cell or array-level electrical fusing functions (to be encapsulated by resin or mineral sheet to arrest arcing), or this may be accomplished with an additional component. The design of the conductive foil sheet includes perforations to accommodate uniform drain & filling of the structural resin material during manufacture. In one embodiment, the electrically conductive foil sheets are matched exactly in size to the thermal assembly for reducing span of discrete parts/assemblies to be simultaneously aligned for interconnect operations. Furthermore, matching the size of the conductive foil sheet and cooling components allows them to be joined together as a higher-precision sub-assembly, with top and bottom cell surfaces accessible, before introduction into the resin container and interconnection to neighboring sub-assemblies which together form the series voltage stack. The series electrical chain may be created by shingling these smaller foil layers together, or layering additional electrically bridging foil sheets atop. This embodiment creates lowest-possible current density in cell array conductors, and elegantly incorporates repeating elongated drain channels for rapid structural resin filling; this is especially valuable for energy storage products utilizing a relatively small cell unit size (e.g. 18650).

Illustrative Temperature and Controlling Electronics

The voltage/temperature sensing and controlling electronics may be mounted on any face of the energy storage system 100, such as side surfaces 110, 112, 104, 106. In one embodiment, the electronics consist of one or more long-format PCBAs mounted along the side of the cell array, with integrated voltage and temperature sense points alongside surface 110, 112. This arrangement eliminates need for separate voltage sense harness and grants temperature sensor access to first and last cell along the outermost thermal assembly. In an alternate embodiment, the PCBA electronics are mounted in plane with the primary conductive foil & cell terminals. In yet another arrangement, the PCBA electronics are mounted remotely, and connected, via laser-welding and/or connectors, through a long aluminum or copper voltage sense harness. The latter arrangement results in additional components and process steps, but offers the most volumetrically-dense packaging and least overall material cost/mass solution. Optionally, the long voltage sense harness may be directly integrated into the conductive material profile in foil sheet 140.

Illustrative Resin/Potting Material

The resin material is engineered to offer (1) thermal protection and (2) structural support the cell and cell array, in addition to the overall product frame in some embodiments. The aforementioned embodiment reduces overall cost, mass, volume, and manufacturing overhead for a given product by forming a geometrically-stiff composite honeycomb cell array structure that can be engaged in shear, bending, and torsion. The resin composition shall be electrically isolating and may be a pure polymer material in composition, or filled with additives exhibiting some combination of low-density, fire resistance, and endothermic combustion characteristics. The polymer material may also be foamed in order to reduce final density within the battery.

The resin properties may be tuned to offer an increase or decrease of properties in the categories of thermal conductivity, flame resistance, cure & rheological characteristics, virgin or aged mechanical response, density & thermal mass, overall cost. Volumetric coverage of the resin material inside the cell array is carefully adjusted to serve as a conduction, convection, and radiation barrier in addition to electrical fusing arc suppressor. Interstitial cell array spaces may be filled partially or fully, depending on product requirements. Resin layers above and below the cell array may bond directly to relatively low-gauge, continuous skins of high mechanical capability, as is commonly seen in sandwich panel construction. Resin layers can be increased locally or globally to add geometric section, or improve impact attenuation and protection from topside or underside abuse cases, and/or to bolster thermal resistance between active materials and thermal runaway venting channels.

The resin properties are generally tunable, within the limits of the chemistries, fillers, and process requirements. These properties fall in the categories of thermal conductivity, flame resistance, cure & rheological characteristics, initial and aged mechanical response, density & thermal mass, and overall cost. By way of illustration, the resin properties can be configured or selected based on consideration of one or more of heat and flame resistance, tensile modulus, elongation, yield strength, adhesive shear strength, mix viscosity, handling time, and density. One skilled in the relevant art will appreciate that there are a multitude of resin formulations that will achieve a balanced suite of properties mentioned above. Each battery array architecture may require variations, modifications, and potting geometries and that a plurality of resins may be utilized in any particular embodiment. The tunability of this resin provides flexibility in the approach to structural energy storage cell arrays.

Illustrative Integration with Electric Vehicle

Figure 5:
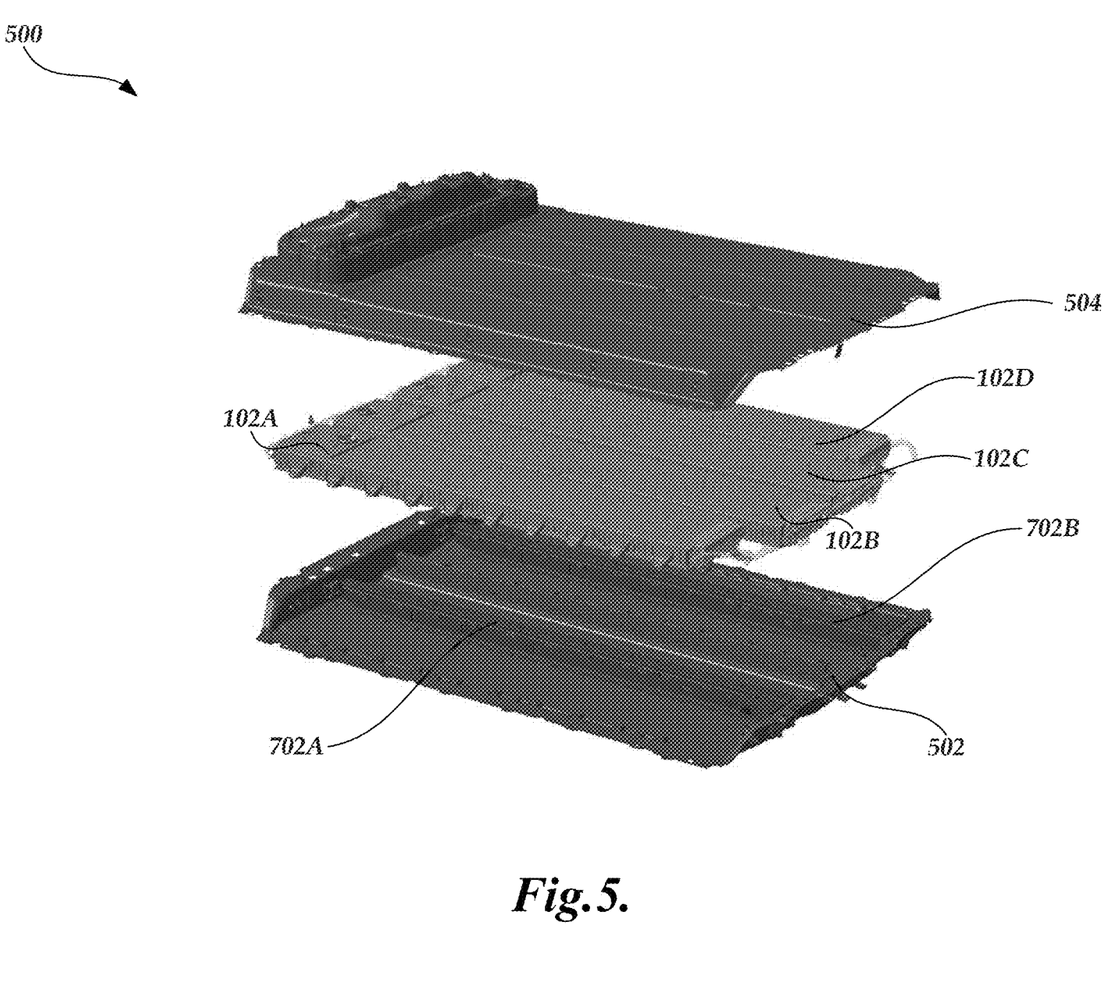
FIG. 5 is a block diagram of a unitary battery pack combined with additional support structures in accordance with illustrative embodiments.
Figure 6A:
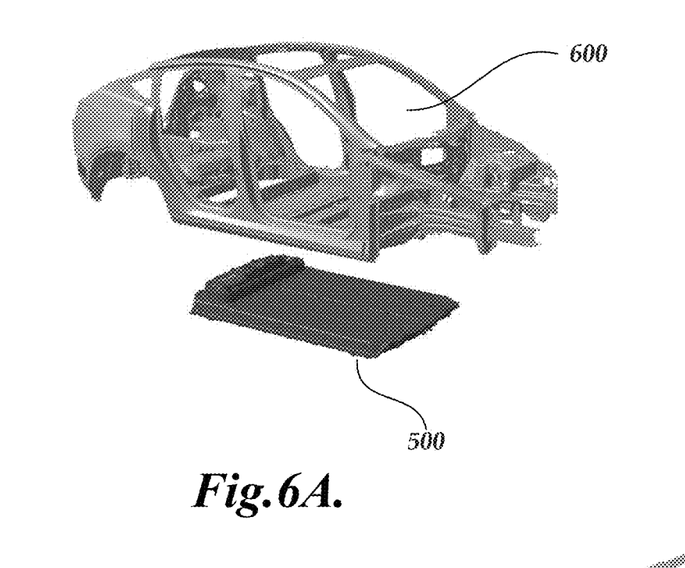
FIGS. 6A and 6B are illustrative of a system combining a unitary battery pack with a vehicle in accordance with illustrative embodiments.
Figure 6B:
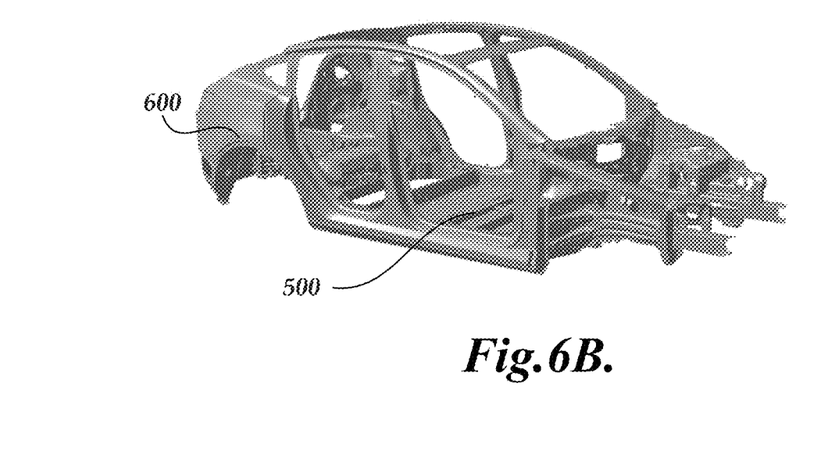
Figure 7A:
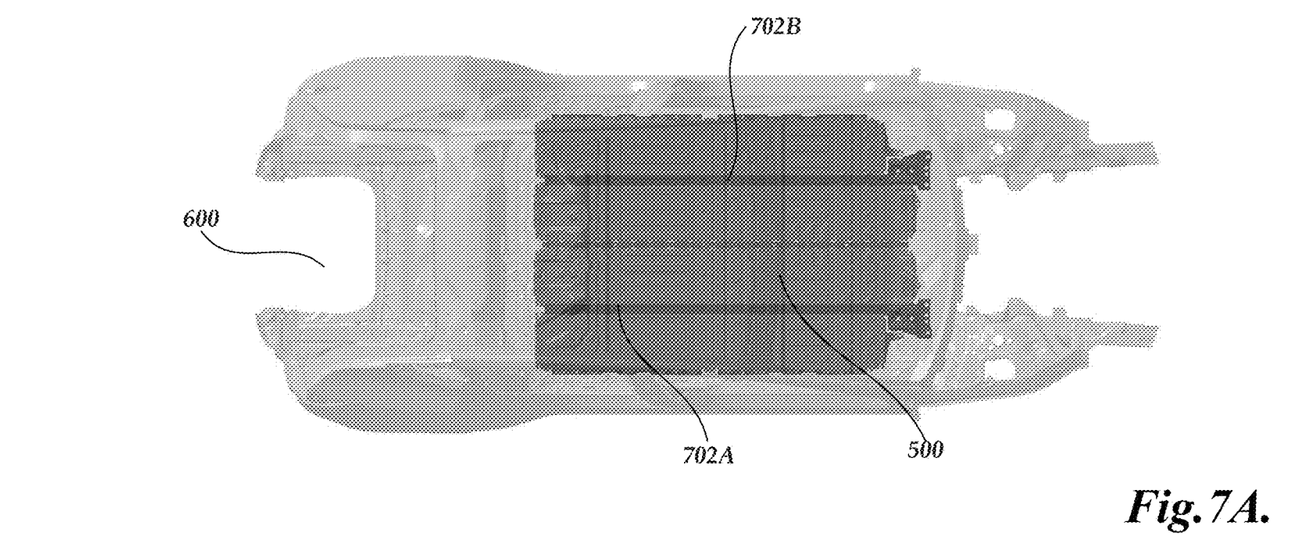
FIGS. 7A and 7B are illustrative of a system combining a unitary battery pack with a vehicle in accordance with illustrative embodiments.
Figure 7B:
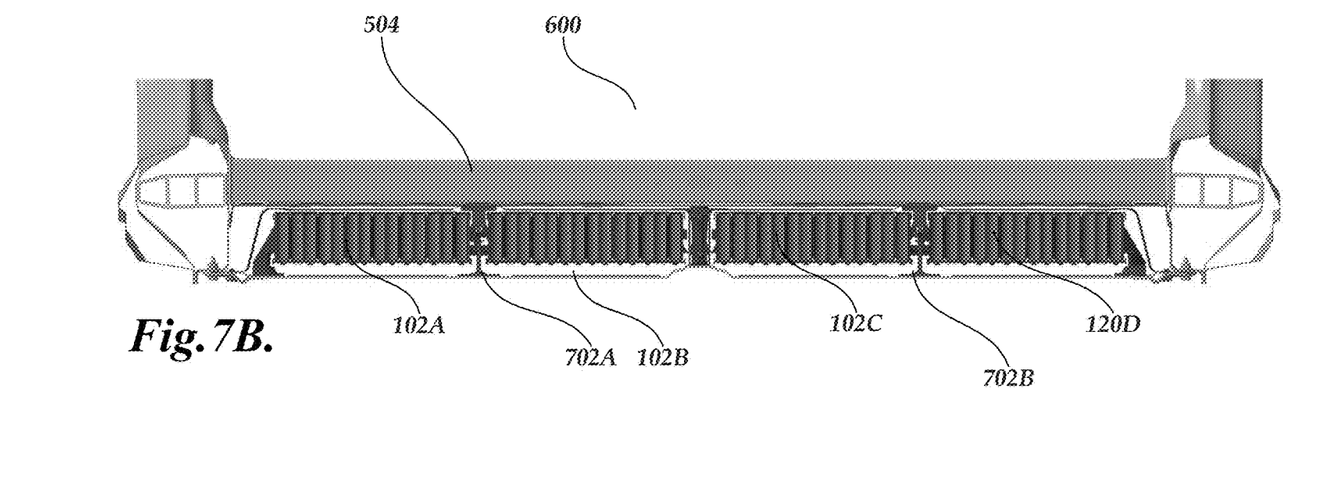

In one embodiment, FIG. 5 shows an exploded view of plurality of battery structures 102A, 102B, 102C, 102D, which are considered individual modules of an energy storage system 100. The plurality of battery structures are suspended within a larger enclosure 500 having a bottom 502 and top 504. As illustrated in FIG. 5, the vehicle 600 includes a number of mounting struts 702A and 702B that are utilized to provide support to the vehicle 600 and the battery structures 102A, 102B, 102C, 102D. The top 504 can be bonded directly to the battery structures 102A, 102B, 102C, 102D and mechanically engage with other components of the vehicle, such as seats. FIGS. 6A and 6B illustrate the mounting of the enclosure 500 within the frame of a vehicle 600. FIG. 6A illustrates that a floor of the vehicle 550 is different. FIG. 7A illustrates a top-down view of the enclosure 500 within the frame 600. FIG. 7B illustrates lateral section view of the vehicle 600 and enclosure 500 illustrating the plurality of battery structures 102A, 102B, 102C, 102D. In this embodiment, the struts 702A and 702B add additional mass to the vehicle 600 and take up additional space that would otherwise be available for additional cell arrays. Still further, each individual battery structure 102A, 102B, 102C, 102D would need to be mounted to the vehicle or secured within a separate enclosure.

Figure 8:
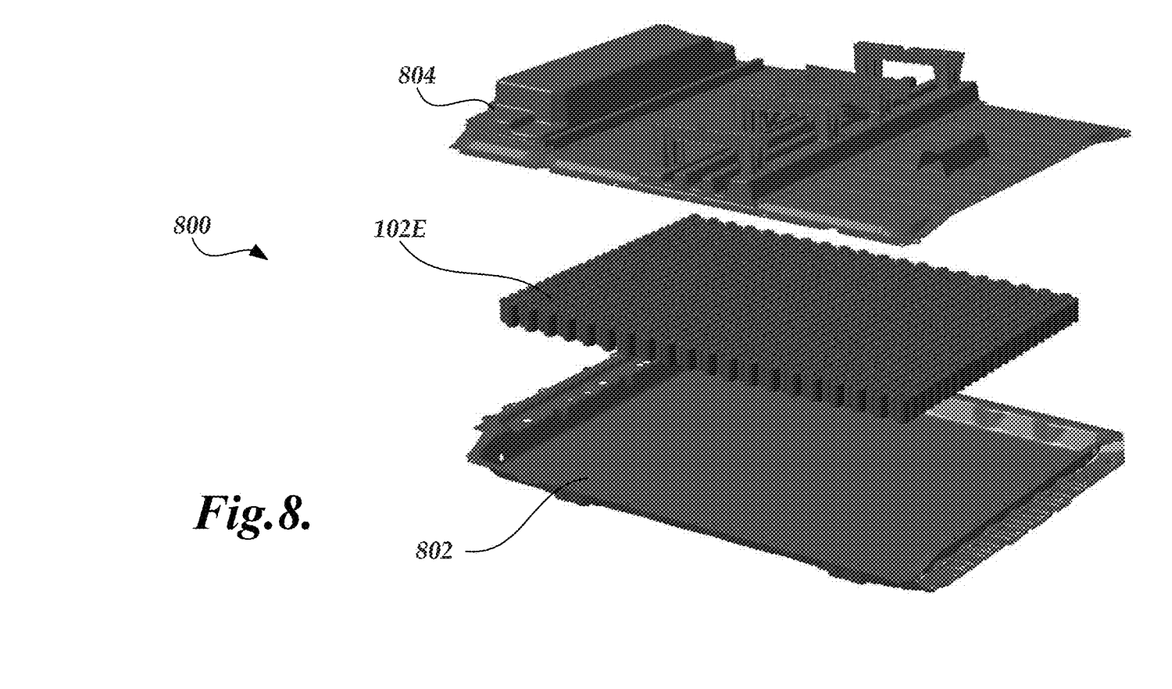
FIG. 8 is a block diagram of a unitary battery pack combined with additional support structures in accordance with illustrative embodiments.
Figure 9A:
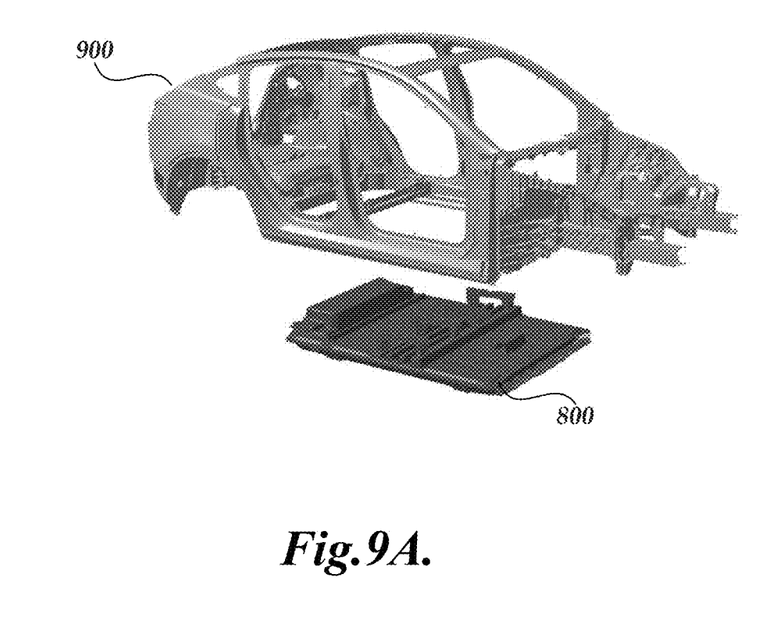
FIGS. 9A and 9B are illustrative of a system combining a unitary battery pack with a vehicle in accordance with illustrative embodiments.
Figure 9B:
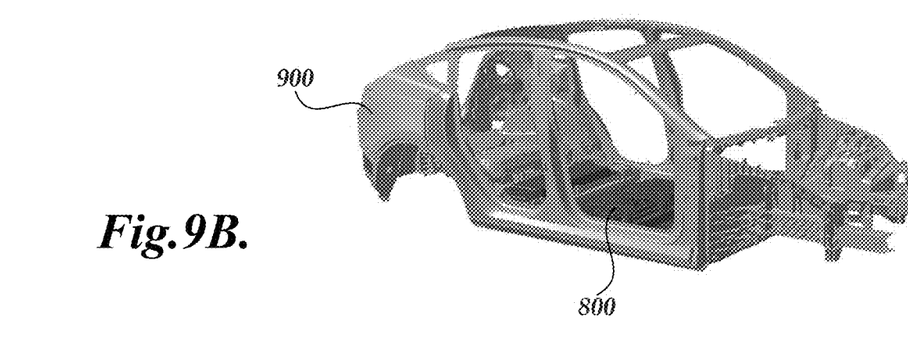
Figure 10A:
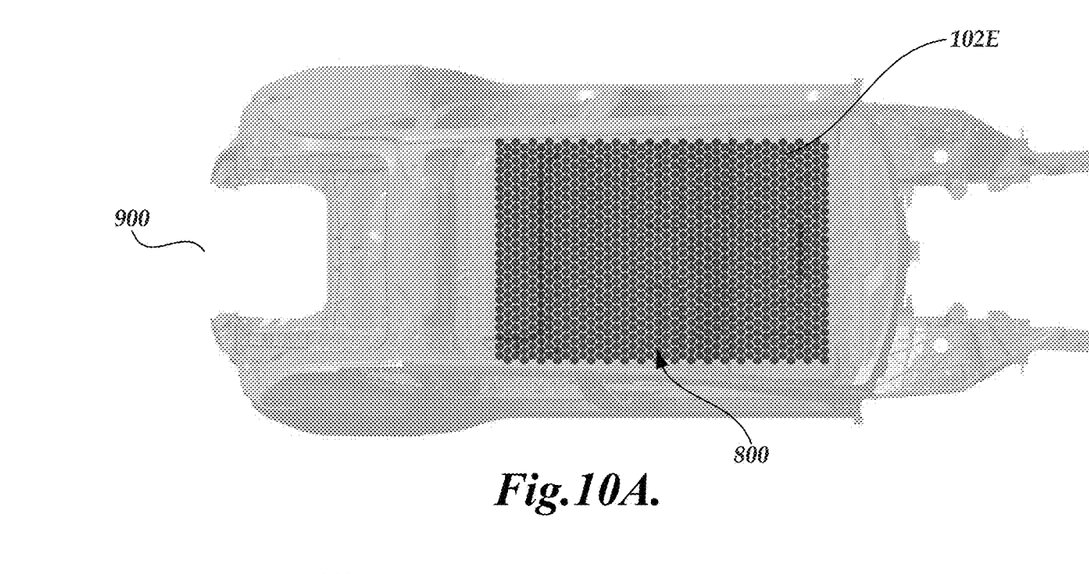
FIGS. 10A and 10B are illustrative of a system combining a unitary battery pack with a vehicle in accordance with illustrative embodiments.
Figure 10B:
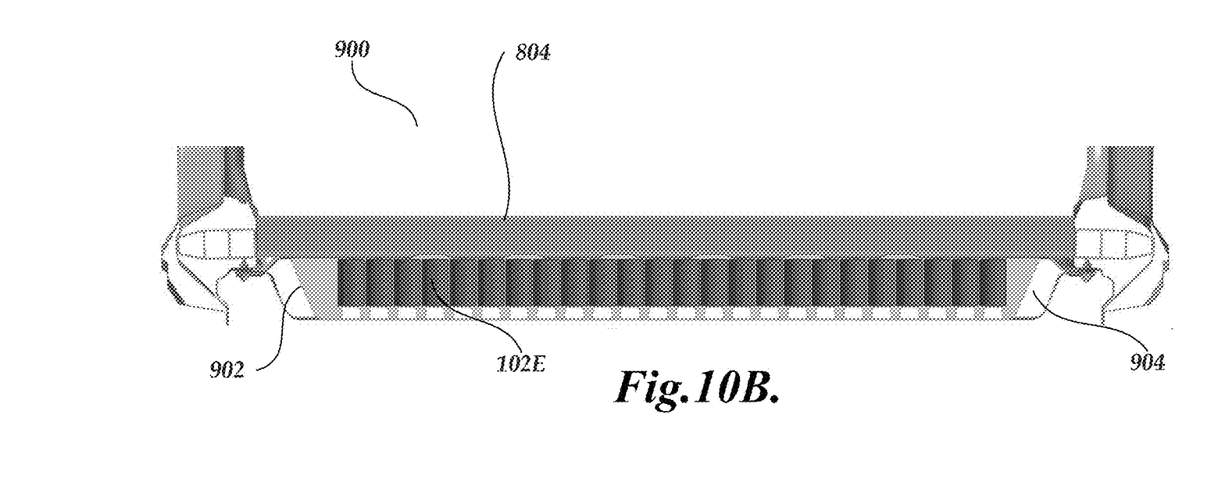

In another embodiment, the individual battery structures are eliminated entirely, with cell array and enclosure combined directly to consolidate redundant structure and reduce the total quantity of components in a given assembly. FIG. 8 shows an exploded view of a single battery structure 102E, which is considered the energy storage system 100. The cell array 102E is mounted directly to a larger enclosure 800 having a bottom 802 and top 804. The top 804 can be bonded directly to the battery structure 102E mechanically engage with other components of the vehicle, such as seats. The top 804 can function as the floor structure of the vehicle for passengers. FIGS. 9A and 9B illustrate the mounting of the enclosure 800 within the frame of a vehicle 900. FIG. 10A illustrates a top-down view of the enclosure 800 within the frame 900. FIG. 10B illustrates lateral section view of the vehicle 900 and enclosure 800 illustrating the single battery structure 102. By way of comparison with vehicle 600 (FIGS. 7A and 7B), the vehicle 900 includes a single, integrated battery structure 102E without requiring additional struts. This provides additional room for the battery structure 102E to incorporate additional cells in the cell arrays or additional cell arrays (depending on the orientation of the cells and cell arrays). This could improve the performance of the vehicle 900, including reducing the overall mass of the vehicle and providing additional volume to incorporate additional cells for improving energy storage capacity. Additionally, the battery structure is illustratively engaged to the vehicle 900 at the perimeter of the integrated battery structure, illustrated at 902 and 904. The enclosure 800, mounted at the perimeter, alone closes off the open bottom face of the vehicle body in a way that no separate passenger floor component is required. The passenger floor in both vehicle 600 and 900 functions in environmental sealing AND and the geometric section to form an efficient mechanical structure and mechanically engaging with other vehicle components (e.g. seats & crash structure).

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application

What is claimed is:

1. A unitary battery component comprising:
    a plurality of cell arrays, wherein individual cell arrays include a plurality of cylindrical-shaped cells arranged in a common orientation such that the plurality of cylindrical-shaped cells form a line of cylindrical-shaped cells;
    a cooling channel formed in proximity to the plurality of cell arrays;
    a potting material formed of a resin compound, the potting material encompassing the plurality of cell arrays and providing structural support and thermal protection for the unitary battery component;
    a bottom surface for supporting the plurality of cell arrays; and
    a top surface for supporting the plurality of cell arrays; wherein the top surface is directly bonded to at least one of the individual cell arrays and forms a floor of a vehicle.

2. The unitary battery component of claim 1, wherein the line of cylindrical shaped cells in individual cell arrays are arranged such that top surfaces of each individual cylindrical-shaped cell are aligned.

3. The unitary battery component of claim 2, wherein the plurality of cell arrays form a substantially horizontal plane along top surfaces of the cylindrical-shaped cells of the plurality of cell arrays.

4. The unitary battery component of claim 2, wherein the top surfaces of each individual cylindrical-shaped cell present a positive and negative terminal.

5. The unitary battery component of claim 3 further comprising one or more side surfaces.

6. The unitary battery component of claim 5 further comprising a set of electrical interconnects for connecting to the vehicle and mounted on at least one of the one or more side surfaces at a level corresponding to the substantially horizontal plane along top surfaces of the cylindrical-shaped cells.

7. The unitary battery component of claim 6 further comprising a foil sheet providing electrical connectivity to individual cylindrical-shaped cells of the plurality of cell arrays.

8. The unitary battery component of claim 1, wherein individual cylindrical-shaped cells in the plurality of cell arrays include a dielectric sleeve encompassing a side surface.

9. The unitary battery component of claim 1, wherein the plurality of cell arrays are configured to form a spacing between the plurality of cell arrays and wherein the cooling channel is formed in the spacing between the plurality of cell arrays.

10. The unitary battery component of claim 8, wherein the cooling channel comprises a manifold for providing cooling fluid through the cooling channel.

11. The unitary battery component of claim 10, wherein the manifold is configured to provide a first portion that corresponds to an input for the cooling fluid and a second portion for output of the cooling fluid.

12. The unitary battery component of claim 1, wherein the top surface forms a thermal barrier between the plurality of cell arrays and the vehicle.

13. The unitary battery component of claim 1 further comprising an external structure encompassing the unitary battery component.

14. A system, the system comprising:
    a vehicle body wherein the vehicle body does not comprise a passenger floor component; and
    a unitary battery component, the unitary battery component comprising:
        a plurality of cell arrays, wherein individual cell arrays include a plurality of cells arranged in a common orientation;
        a cooling channel formed in proximity to the plurality of cell arrays;
        a potting material formed of a resin compound, the potting material encompassing the plurality of cell arrays and providing structural support and thermal protection for the unitary battery component; and an enclosure comprising a mounting interface, an enclosure top, and an enclosure bottom;

wherein the plurality of cell arrays and the potting material are located within the enclosure;

wherein the enclosure top forms a floor of the vehicle body;

wherein the unitary battery component is mounted to and forms a seal against the vehicle body via the mounting interface.

15. The system of claim 14, wherein the plurality of cells correspond to at least one of cylindrical-shaped cells or rectangular-shaped cells and wherein the common orientation of the plurality of cell arrays include a line of cells arranged such that top surfaces of each individual cell are aligned.

16. The system of claim 14, wherein plurality of cell arrays form a substantially horizontal plane along top surfaces of the plurality of cells of the plurality of cell arrays.

17. The system of claim 16, wherein the top surface of each individual cell present a positive and negative terminal.

18. The system of claim 16 further comprising one or more side surfaces.

19. The system of claim 18 further comprising a set of electrical interconnects for connecting to a vehicle and mounted on at least one of the one or more side surfaces at a level corresponding to the substantially horizontal plane along top surfaces of the plurality of cells.

20. The system of claim 14 further comprising a foil sheet providing electrical connectivity to individual cells of the plurality of cell arrays.

21. The system of claim 14, wherein the plurality of cell arrays are configured to form a minimal spacing between the plurality of cell arrays and wherein the cooling channel is formed in the minimal spacing between the plurality of cell arrays.

22. The system of claim 14 further comprising at least one support strut located alongside the unitary battery component for providing additional structural support for the vehicle body.

23. The system of claim 14, wherein the unitary battery component is mounted to the vehicle body at a perimeter of the unitary battery component.

24. A unitary battery component comprising:

at least one energy module;

a cooling channel formed in proximity to the at least one energy module;

a potting material formed of a resin compound, the potting material encompassing the at least one energy module and providing structural support and thermal protection for the unitary battery component; and a bottom surface for supporting and protecting the at least one energy module; and a top surface for supporting the at least one energy module;

wherein the top surface is directly bonded to the at least one energy module and forms a floor of a vehicle;

wherein an environmental seal is formed between the unitary battery component and a vehicle body.

25. The unitary battery component of claim 24, wherein the at least one energy module comprises a plurality of cells; and wherein each individual cell of the plurality of cells comprises a top cell surface;

wherein the top cell surface comprises a positive and negative terminal.

26. The unitary battery component of claim 24 further comprising a foil sheet providing electrical connectivity to individual cells of the at least one energy module.

27. The unitary battery component of claim 24, wherein the at least one energy module comprises a plurality of cell arrays and the plurality of cell arrays are configured to form a spacing between the cell arrays and wherein the cooling channel is formed in the spacing between the plurality of cell arrays.

28. The unitary battery component of claim 24 further comprising an external structure encompassing the unitary battery component.

29. The unitary battery component of claim 24, wherein the at least one energy module comprises a plurality of cells and the plurality of cells correspond to at least one of cylindrical-shaped cells or rectangular-shaped cells.

30. The system of claim 14, wherein seal is an environmental seal.

31. The system of claim 14, wherein the enclosure top mechanically engages a vehicle seat.

* * * * *